US009559600B2

(12) United States Patent
Hayakawa et al.

(10) Patent No.: US 9,559,600 B2
(45) Date of Patent: Jan. 31, 2017

(54) SWITCHED-MODE POWER SUPPLY DEVICE

(71) Applicant: SANKEN ELECTRIC CO., LTD., Niiza-Shi, Saitama (JP)

(72) Inventors: Akira Hayakawa, Fujimino (JP); Masaaki Shimada, Fujimi (JP); Tatsuhiko Koga, Sakado (JP)

(73) Assignee: SANKEN ELECTRIC CO., LTD., Niiza-Shi (JP)

( * ) Notice: Subject to any disclaimer, the term of this patent is extended or adjusted under 35 U.S.C. 154(b) by 0 days.

(21) Appl. No.: 14/965,983

(22) Filed: Dec. 11, 2015

(65) Prior Publication Data

US 2016/0172986 A1 Jun. 16, 2016

(30) Foreign Application Priority Data

Dec. 12, 2014 (JP) .................................. 2014-251769

(51) Int. Cl.
*H02M 3/335* (2006.01)
*H02M 1/00* (2006.01)

(52) U.S. Cl.
CPC . *H02M 3/33523* (2013.01); *H02M 2001/0035* (2013.01)

(58) Field of Classification Search
CPC .......... G05F 1/461; G05F 1/462; G05F 1/565; H02M 3/33515; H02M 3/33523; H02M 3/33553
USPC .............. 323/274, 275, 283–285; 363/21.13, 363/21.15, 21.16, 21.18
See application file for complete search history.

(56) References Cited

U.S. PATENT DOCUMENTS

| 2002/0186572 | A1* | 12/2002 | Nishida | H02M 3/3385 363/21.16 |
| 2006/0017426 | A1* | 1/2006 | Yang | H02M 3/33523 323/283 |
| 2010/0008109 | A1* | 1/2010 | Morota | H02M 3/33523 363/21.16 |
| 2010/0027299 | A1* | 2/2010 | Fang | H02M 3/33507 363/21.15 |
| 2011/0075450 | A1* | 3/2011 | Shimada | H02M 1/36 363/21.18 |

(Continued)

FOREIGN PATENT DOCUMENTS

JP 2007-215316 A 8/2007

*Primary Examiner* — Adolf Berhane
*Assistant Examiner* — Gary Nash
(74) *Attorney, Agent, or Firm* — Mots Law, PLLC (57) ABSTRACT

An error amplifier outputs an error voltage to the primary side as a feedback signal indicating a state of the load. An oscillator controls a switching frequency of the switching operation such that the switching frequency is reduced from a highest normal frequency to a lowest normal frequency based on the feedback signal in a load range from a heavily-loaded state to a lightly-loaded state in a normal oscillating operation that continuously performs the switching operation. An intermittent oscillation control circuit intermittently performs the switching operation by stopping the switching operation based on the feedback signal when the load is lighter than a previously set reference. The oscillator increases the switching frequency from an intermittent-operation frequency lower than the lowest normal frequency in an intermittent oscillation duration in which the switching operation is performed in the intermittent oscillating operation.

12 Claims, 4 Drawing Sheets

(56) References Cited

U.S. PATENT DOCUMENTS

| | | | | |
|---|---|---|---|---|
| 2012/0230062 A1* | 9/2012 | Nagai | ............... | H02M 3/33523 |
| | | | | 363/21.01 |
| 2013/0141947 A1* | 6/2013 | Sakurai | ............. | H02M 3/33523 |
| | | | | 363/21.16 |
| 2013/0294118 A1* | 11/2013 | So | ..................... | H02M 3/33507 |
| | | | | 363/21.16 |
| 2013/0308349 A1* | 11/2013 | Yu | ..................... | H02M 3/33515 |
| | | | | 363/21.15 |

\* cited by examiner

SWITCHED-MODE POWER SUPPLY DEVICE

CROSS REFERENCE TO RELATED APPLICATIONS

This application claims priority based on 35 USC 119 from prior Japanese Patent Application No. 2014-251769 filed on Dec. 12, 2014, entitled "SWITCHED-MODE POWER SUPPLY DEVICE", the entire contents of which are hereby incorporated by reference.

BACKGROUND

The disclosure relates to a switched-mode power supply device configured to control an output voltage through a switching operation.

A switched-mode power supply device performs an intermittent oscillating operation that intermittently performs a switching operation in a lightly-loaded state (see Japanese Patent Laid-open No. 2007-215316: Patent literature 1, for example). The switched-mode power supply device according to Japanese Patent Laid-open No. 2007-215316 is provided with an upper limit frequency in accordance with a feedback voltage and configured to perform an intermittent oscillating operation that stops after being turned on a previously set number N of times.

SUMMARY

An embodiment provides a switched-mode power supply device that comprises a transformer comprising a primary winding in a primary side to which a DC voltage is applied and a secondary winding, a switching circuit connected to the primary winding, a rectifying-smoothening circuit that rectifies and smoothens a pulse voltage generated at the secondary winding, by switching the switching element, an output unit that outputs an output voltage obtained by the rectifying-smoothening circuit to a load, an error amplifier that outputs an error voltage to the primary side as a feedback signal indicating a state of the load, the error voltage being obtained by comparing the output voltage to a reference voltage, an oscillator that controls a switching frequency of the switching operation such that the switching frequency is reduced from a highest normal frequency to a lowest normal frequency based on the feedback signal in a load range from a heavily-loaded state to a lightly-loaded state in a normal oscillating operation that continuously performs the switching operation, and an intermittent oscillation control circuit that intermittently performs the switching operation by stopping the switching operation based on the feedback signal when the load is lighter than a previously set reference, wherein the oscillator increases the switching frequency from an intermittent-operation frequency lower than the lowest normal frequency in an intermittent oscillation duration in which the switching operation is performed in the intermittent oscillating operation.

DETAILED DESCRIPTION

Figure 1:
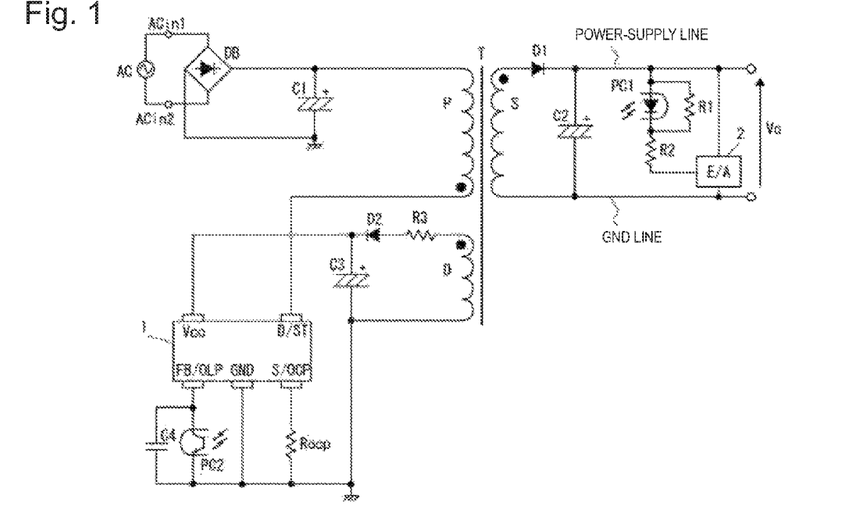
FIG. 1 is a circuit configuration diagram of the configuration of a switched-mode power supply device according to an embodiment.

As illustrated in FIG. 1, a switched-mode power supply device according to an embodiment includes rectifying circuit DB, smoothing capacitors C1, C2, and C3, transformer T, controller IC 1, rectifying diodes D1 and D2, error amplifier (E/A) 2, light-emitting diode PC1 and light-receiving transistor PC2 included in a photo coupler, current-detection register Rocp, registers R1, R2, and R3, and capacitor C4.

Alternating-current input terminals ACin1 and ACin2 of rectifying circuit DB including bridge diodes are connected to commercially-available alternating-current source AC, an input voltage from which is provided with full-wave rectification to be output from rectifying circuit DB. Smoothing capacitor C1 connects a rectified-output positive terminal and a rectified-output negative terminal of rectifying circuit DB. The rectified-output negative terminal of rectifying circuit DB is connected to an earth terminal. This configuration enables the input voltage from commercially-available alternating-current source AC to be rectified and smoothed through rectifying circuit DB and smoothing capacitor C1, whereby a direct-current voltage is obtained.

Controller IC 1 includes a built-in switching element such as a power metal oxide semiconductor field effect transistor (MOSFET), and a built-in control circuit to control switching of the switching element. Controller IC 1 includes a D/ST (MOSFET drain; starting current input) terminal, an S/OCP (MOSFET source; overcurrent protection) terminal, a Vcc (control circuit power-supply voltage input) terminal, a FB/OLP (feedback signal input; overload protection signal input) terminal, and a GND terminal.

Transformer T includes primary winding P, auxiliary winding D, and secondary winding S, and supplies electric power from a primary side (input side) to a secondary side (load side). The rectified-output positive terminal of rectifying circuit DB is connected to one end of primary winding P of transformer T, whereas the other end of primary winding P of transformer T is connected to the D/ST terminal of controller IC 1. The S/OCP terminal of controller IC 1 is connected to an earth terminal through register Rocp. With this configuration, turning on and off of the built-in switching element of controller IC 1 is controlled to transfer electric power provided to primary winding P of transformer T to secondary winding S of transformer T, thereby generating a pulsating flow through secondary winding S of transformer T. Current-detection register Rocp is a register that is connected to the S/OCP terminal and detects, as voltage signal $V_{ocp}$, current flowing through the built-in switching element of controller IC 1. Controller IC 1 has an overcurrent protection (OCP) function to restrict electric power supplied to the secondary side when voltage signal $V_{ocp}$ corresponding to the current flowing through the switching element is equal to or larger than a previously set overcurrent threshold.

Both ends of secondary winding S of transformer T are connected through smoothing capacitor C2 via rectifying diode D1. Rectifying diode D1 and smoothing capacitor C2 serve as a secondary-side rectifying-smoothing circuit. Voltage induced across secondary winding S of transformer T is rectified and smoothed through rectifying diode D1 and smoothing capacitor C2, and voltage between terminals of smoothing capacitor C2 is output from an output terminal as output voltage Vo. A line connected to the positive terminal of smoothing capacitor C2 is a power-supply line, whereas a line connected to the negative terminal of smoothing capacitor C2 is a GND line connected to the earth terminal.

Error amplifier 2 connects the power-supply line and the GND line in series. Error amplifier 2 connecting the power-supply line and the GND line compares output voltage Vo to a reference voltage so as to control current flowing through light-emitting diode PC1 of the photo coupler in accordance with an error voltage between output voltage Vo and the reference voltage. The FB/OLP terminal of controller IC 1 is connected to the earth terminal through light-emitting diode PC2 and capacitor C4 connected in parallel. This configuration enables a feedback (FB) signal in accordance with the error voltage between output voltage Vo and the reference voltage to be transmitted from light-emitting diode PC1 on the secondary side to light-receiving transistor PC2 on the primary side and input as FB voltage $V_{FB}$ to the FB/OLP terminal of controller IC 1. Controller IC 1 controls a duty ratio of the switching element based on FB voltage $V_{FB}$ input to the FB/OLP terminal, and thus the amount of electric power supplied to the secondary side.

Smoothing capacitor C3 connects both ends of auxiliary winding D of transformer T through register R3 and rectifying diode D2, and a connection point of rectifying diode D2 and smoothing capacitor C3 is connected to the Vcc terminal of controller IC 1. This configuration enables voltage generated across auxiliary winding D to be rectified and smoothed through rectifying diode D2 and smoothing capacitor C3 and supplied as IC power-supply voltage Vcc to the Vcc terminal of controller IC 1.

First Embodiment

Figure 2:
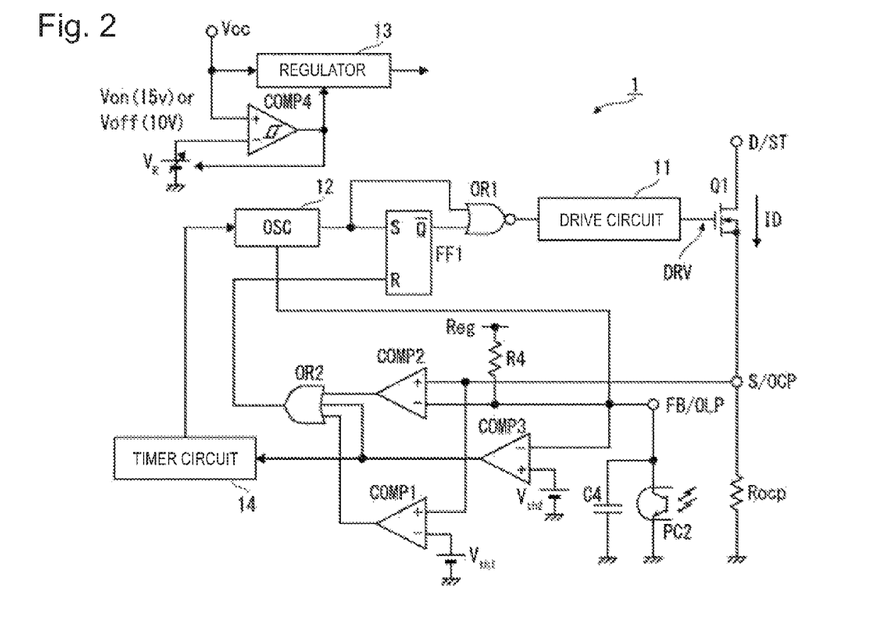
FIG. 2 illustrates a circuit configuration of a controller IC illustrated in FIG. 1 according to a first embodiment.

The following describes a circuit configuration of controller IC 1 illustrated in FIG. 1 according to a first embodiment with reference to FIG. 2.

As illustrated in FIG. 2, controller IC 1 includes switching element Q1 including an N-channel power MOSFET, drive circuit 11, OSC (internal oscillator) 12, regulator 13, timer circuit 14, variable voltage $V_R$, overcurrent threshold voltage $V_{th1}$, burst threshold voltage $Vth_2$, OR circuits OR1 and OR2, flip-flop FF1, comparators COMP1, COMP2, COMP3, and COMP4, and register R4.

The drain terminal of switching element Q1 is connected to the D/ST terminal, the source terminal thereof is connected to the S/OCP terminal, and the gate terminal thereof is connected to drive circuit 11 that controls turning on and off of switching element Q1 by outputting drive signal DRV for driving switching element Q1. Drive circuit 11 receives an inverted output from OR circuit OR1.

The input terminal of OR circuit OR1 receives an output from OSC 12 and an output from inverted output terminal Q- of flip-flop FF1. The S terminal of flip-flop FF1 is connected to the output of OSC 12, whereas the R terminal of flip-flop FF1 is connected to the output of OR circuit OR2. Flip-flop FF1 serves as a PWM latch circuit. With this configuration, when a clock signal output from OSC 12 is at an L level and flip-flop FF1 is set with an output signal from inverted output terminal Q- being at the L level, an output signal at an H level from OR circuit OR1 is input to drive circuit 11, so that switching element Q1 is turned on. In this manner, the clock signal output from OSC 12 controls timing of turning on a switching operation of switching element Q1, and the switching frequency of the switching operation is set to be the oscillation frequency of the clock signal output from OSC 12.

The S/OCP terminal is connected to the non-inverting terminal of comparator COMP1 and the non-inverting terminal of comparator COMP2. Comparator COMP1 is an OCP comparator that detects overcurrent. The inverting terminal of comparator COMP1 is connected to overcurrent threshold voltage $V_{th1}$. When voltage signal $V_{ocp}$ from the S/OCP terminal corresponding to drain current ID flowing through switching element Q1 is equal to or higher than overcurrent threshold voltage $V_{th1}$, comparator COMP1 outputs an output signal at the H level. This H-level output signal of comparator COMP1 resets flip-flop FF1 through OR circuit OR2, and sets the output signal of OR circuit OR1 to the L level, so that drive circuit 11 turns off switching element Q1 accordingly.

Comparator COMP2 is a current sense converter for performing a feedback control of the duty ratio of switching element Q1 based on a FB signal input as FB voltage $V_{FB}$ to the FB/OLP terminal. The inverting input terminal of comparator COMP2 is connected to the FB/OLP terminal connected to reference voltage Reg through register R4. Comparator COMP2 compares voltage signal $V_{ocp}$ and FB voltage $V_{FB}$, and outputs an output signal at the H level when voltage signal $V_{ocp}$ is equal to or higher than FB voltage $V_{FB}$. This H-level output signal of comparator COMP2 resets flip-flop FF1 through OR circuit OR2, and sets an output signal of OR circuit OR1 to the L level, so that drive circuit 11 turns off switching element Q1 accordingly. In this manner, the duty ratio of the output signal of OR circuit OR1 is controlled based on the FB signal as a PWM signal.

Comparator COMP3 is a burst comparator that controls an intermittent oscillation of switching element Q1 based on a FB signal. In other words, comparator COMP3 serves as an intermittent oscillation control circuit configured to control the intermittent oscillation that intermittently performs the switching operation by stopping the switching operation when it is determined based on the FB signal that a load is lighter than a previously set reference. The non-inverting input terminal of comparator COMP3 is connected to burst threshold voltage $Vth_2$. When FB voltage $V_{FB}$ is lower than burst threshold voltage $Vth_2$, comparator COMP3 outputs an output signal at the H level. This H-level output signal of comparator COMP3 resets flip-flop FF1 through OR circuit OR2, and sets an output signal of OR circuit OR1 to the L level, so that drive circuit 11 turns off switching element Q1 accordingly. Switching element Q1 is kept turned off until FB voltage $V_{FB}$ becomes equal to or larger than burst threshold voltage $Vth_2$. When FB voltage $V_{FB}$ becomes equal to or higher than burst threshold voltage $Vth_2$, the output signal of comparator COMP3 is set to the L level, and the switching operation of switching element Q1 is started. Thus, (ON/OFF) timing of an intermittent oscillating operation is determined by fluctuation of FB voltage $V_{FB}$, and the intermittent oscillating operation of switching element Q1 is performed in a load range from a lightly-loaded state to an unloaded state. Since the (ON/OFF) timing of the intermittent oscillating operation is determined by variation of FB voltage $V_{FB}$, a switching operation time of switching element Q1 depends on a load in the intermittent oscillating operation.

Comparator COMP4 is a comparison circuit that compares IC power-supply voltage Vcc of the Vcc terminal and variable voltage $V_R$. The non-inverting input terminal of comparator COMP4 is connected to the Vcc terminal, whereas the inverting input terminal thereof is connected to variable voltage $V_R$. Variable voltage $V_R$ is set to first reference voltage Von (for example, 15V) when comparator COMP4 outputs an output signal at the L level, and set to second reference voltage Voff (for example, 10V) lower than first reference voltage Von when comparator COMP4 serving as an UVLO circuit outputs an output signal at the H level. With this configuration, the output signal of comparator COMP4 has a hysteresis characteristic. Smoothing capacitor C3 illustrated in FIG. 1 is charged by a starter circuit not illustrated. Smoothing capacitor C3 is at the H level when IC power-supply voltage Vcc is larger than first reference voltage Von, and at the L level when IC power-supply voltage Vcc is equal to or lower than second reference voltage Voff.

The output terminal of comparator COMP4 is connected to regulator 13. Regulator 13 is supplied electric power from the Vcc terminal, and when the output signal of comparator COMP4 is at the H level, operates to supply power-supply voltage for operating each component of controller IC 1. Specifically, the output signal of comparator COMP4 is a signal for controlling on and off of controller IC 1, and is at the H level in a steady operation of controller IC 1 (when the switching operation is on) while comparator COMP4 is serving as an UVLO circuit. Accordingly, first reference voltage Von set to variable voltage $V_R$ is a voltage to start the operation of controller IC 1, and second reference voltage Voff set to variable voltage $V_R$ is a voltage to stop the operation of controller IC 1.

When the output signal of comparator COMP3 is turned off by shifting from the H level to the L level, timer circuit 14 outputs an oscillation-start detection signal to OSC 12 and starts measurement of oscillation duration (hereinafter, referred to as an intermittent oscillation duration) in the intermittent oscillating operation. Then, timer circuit 14 outputs a first frequency switching signal to OSC 12 when previously set time T1 has passed since the outputting of the oscillation-start detection signal, and outputs second frequency switching signal to OSC 12 when previously set time T2 has passed since the outputting of the first frequency switching signal. Time T1 and time T2 may be individually set as appropriate, and may be set equal to each other.

Figure 3:
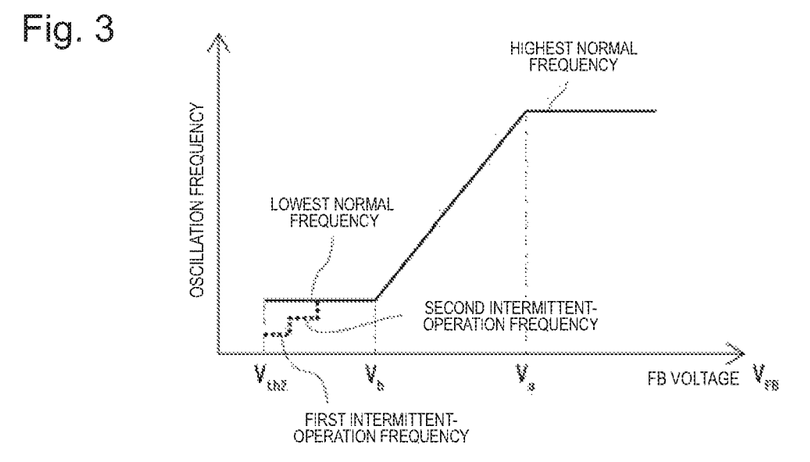
FIG. 3 is a graph for describing an oscillation frequency change operation of an OSC illustrated in FIG. 2.

OSC 12 has a frequency change function to change the oscillation frequency of a clock signal to be output. OSC 12 reduces the oscillation frequency based on a FB signal in a load range from a heavily-loaded state to a lightly-loaded state and reduces the switching frequency of the switching operation in a normal oscillating operation that continuously performs the switching operation. As illustrated in FIG. 3, when FB voltage $V_{FB}$ is equal to or higher than frequency-reduction start voltage Va, OSC 12 sets the oscillation frequency to a highest normal frequency. When FB voltage $V_{FB}$ is in a range of frequency-reduction start voltage Va to frequency-reduction end voltage Vb lower than frequency-reduction start voltage Va, OSC 12 reduces the oscillation frequency from the highest normal frequency to a lowest normal frequency in accordance with FB voltage $V_{FB}$. When FB voltage $V_{FB}$ is equal to or lower than frequency-reduction end voltage Vb, OSC 12 sets the oscillation frequency to the lowest normal frequency. FIG. 3 illustrates an example in which the oscillation frequency is reduced proportionally to FB voltage $V_{FB}$, but the oscillation frequency may be reduced in stages.

Figure 4:
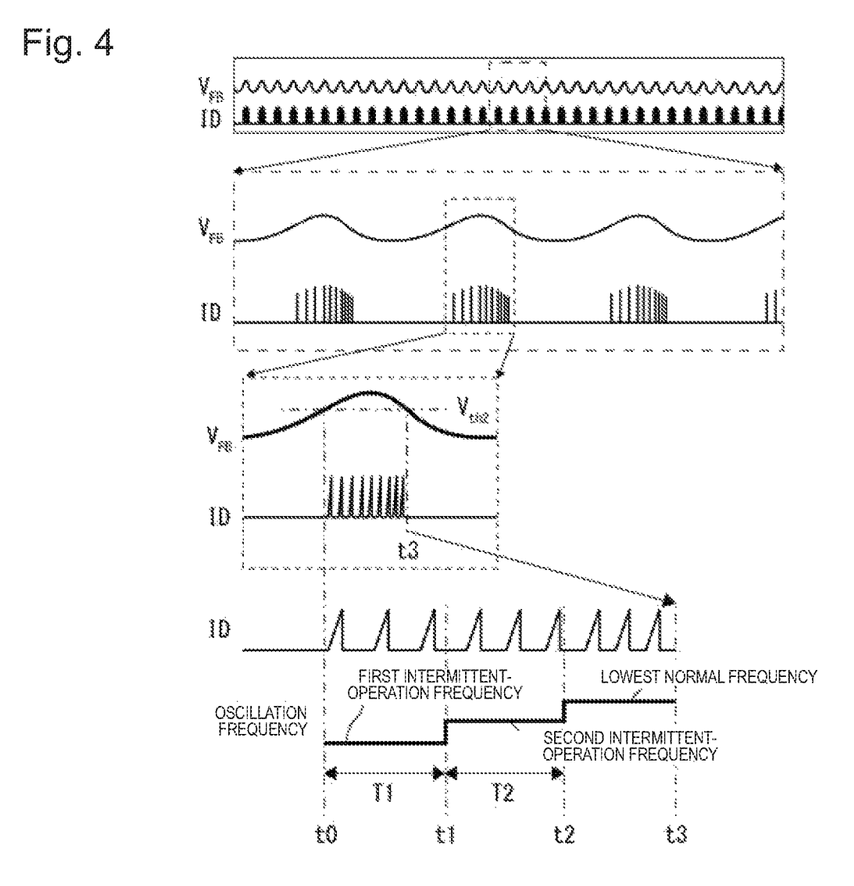
FIG. 4 shows graphs for describing an oscillation frequency change operation in an intermittent oscillating operation (a lightly-loaded state with a relatively large load) of the OSC illustrated in FIG. 2.

FIG. 4 shows graphs indicating FB voltage $V_{FB}$, drain current ID of switching element Q1, and the oscillation frequency of OSC 12 in the intermittent oscillating operation in the lightly-loaded state with a relatively large load. In FIG. 4, a time axis is illustrated longer as it goes down. As illustrated in FIGS. 4A to 4D, when FB voltage $V_{FB}$ becomes equal to or higher than burst threshold voltage $Vth_2$ at time t0, the output signal of comparator COMP3 becomes the L level, timer circuit 14 inputs the oscillation-start detection signal to OSC 12, and OSC 12 sets the oscillation frequency to a first intermittent-operation frequency lower than the lowest normal frequency. This starts the switching operation at first intermittent-operation frequency switching element Q1.

Timer circuit 14 outputs the first frequency switching signal to OSC 12 at time t1 at which time T1 have passed since the outputting of the oscillation-start detection signal. Having received the first frequency switching signal, OSC 12 switches the oscillation frequency to a second intermittent-operation frequency higher than the first intermittent-operation frequency and lower than the lowest normal frequency. This switches the switching operation of switching element Q1 to the second intermittent-operation frequency.

Timer circuit 14 outputs the second frequency switching signal to OSC 12 at time t2 at which time T2 have passed since the outputting of the first frequency switching signal. Having received the second frequency switching signal, OSC 12 switches the oscillation frequency to the lowest normal frequency. This switches the switching operation of switching element Q1 to the lowest normal frequency, OSC 12 maintains the switching frequency at the lowest normal frequency until the intermittent oscillation duration ends.

When FB voltage $V_{FB}$ is equal to or lower than burst threshold voltage $Vth_2$ at time t3, the output signal of comparator COMP3 is set to the H level, which stops the switching operation of switching element Q1 and then ends the intermittent oscillation duration. As described above, in the lightly-loaded state with a relatively large load, OSC 12 switches the oscillation frequency to the first intermittent-operation frequency, the second intermittent-operation frequency, and the lowest normal frequency in this order to perform the intermittent oscillating operation at the first intermittent-operation frequency, the second intermittent-operation frequency, and the lowest normal frequency in the intermittent oscillation duration. In the lightly-loaded state with a relatively large load, a transition from the intermittent oscillating operation to the normal oscillating operation is smoothly performed because the switching frequency has been increased to and is maintained at the lowest normal frequency in the intermittent oscillation duration as illustrated with a dotted line in FIG. 3.

Figure 5:
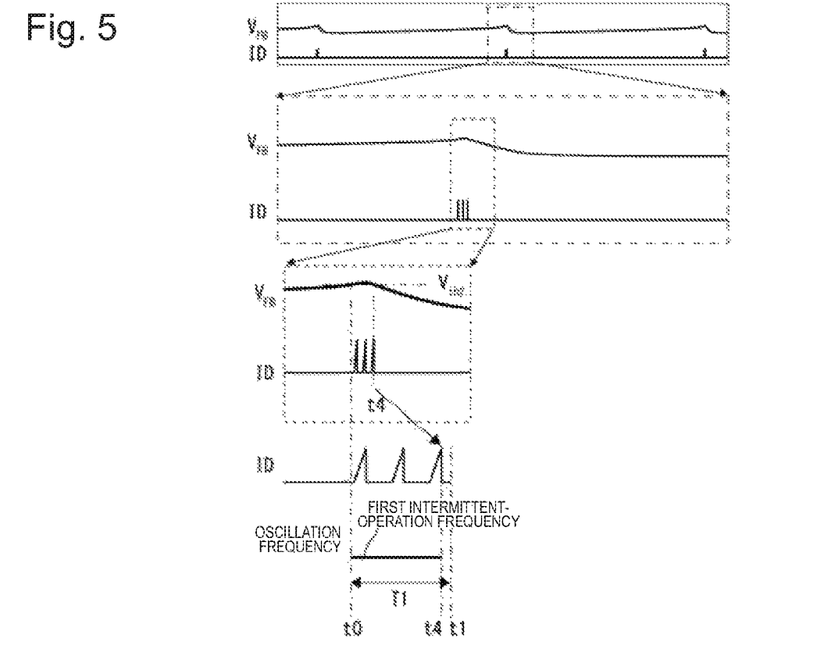
FIG. 5 shows graphs for describing an oscillation frequency change operation of the OSC illustrated in FIG. 2 in an intermittent oscillating operation (at microcomputer standby)

FIG. 5 shows graphs illustrating FB voltage $V_{FB}$, drain current ID of switching element Q1, and the oscillation frequency of OSC 12 in the intermittent oscillating operation with as small load as several mA at microcomputer standby, for example. In FIG. 5, a time axis is illustrated longer as it goes down. With as small load as several mA, FB voltage $V_{FB}$ becomes equal to or lower than burst threshold voltage $Vth_2$ before time t1 is reached, in other words, before time T1 has passed since the outputting of the oscillation-start detection signal, as illustrated in FIG. 5. Accordingly, the oscillation frequency does not switch to the second intermittent-operation frequency nor the lowest normal frequency in the intermittent oscillation duration, and the intermittent oscillating operation is performed at the first intermittent-operation frequency.

Figure 6:
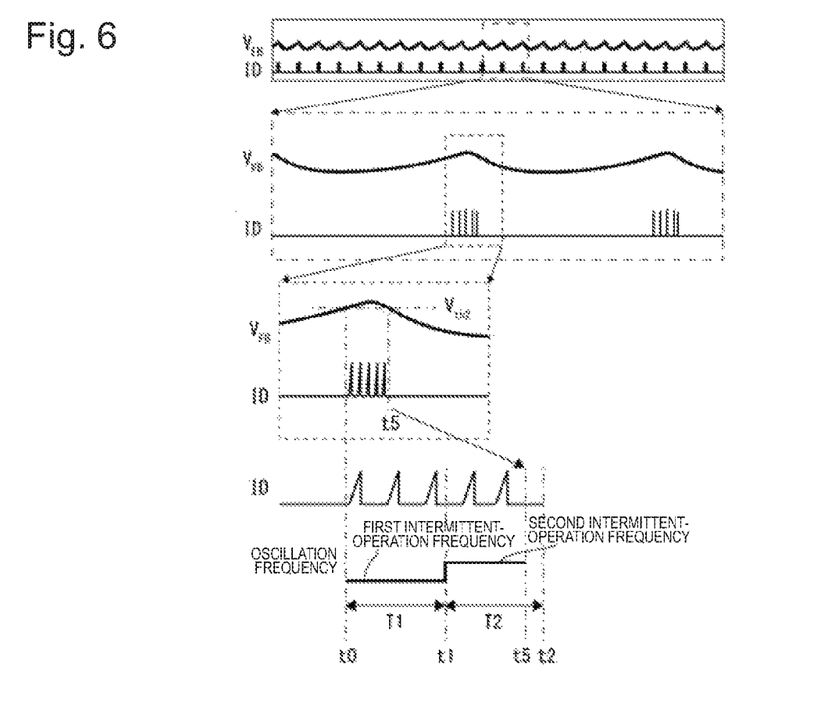
FIG. 6 shows graphs for describing an oscillation frequency change operation of the OSC illustrated in FIG. 2 in an intermittent oscillating operation (at several W control)

FIG. 6 shows graphs illustrating FB voltage $V_{FB}$, drain current ID of switching element Q1, and the oscillation frequency of OSC 12 in the intermittent oscillating operation at several W control under a lightly-loaded operating condition by setting and the like. In FIG. 6, a time axis is illustrated longer as it goes down. As illustrated in FIG. 6, at the several W control under the lightly-loaded operating condition, FB voltage $V_{FB}$ becomes equal to or lower than burst threshold voltage $Vth_2$ before time t2 is reached, in other words, before time T2 has passed since the outputting of the first frequency switching signal. Accordingly, the oscillation frequency does not switch to the lowest normal frequency in the intermittent oscillation duration, and the intermittent oscillating operation is performed at the first intermittent-operation frequency and the second intermittent-operation frequency.

As described above, since the intermittent oscillation duration changes with a load, switching of the oscillation frequency of OSC 12 is controlled based on timing of a change in the first embodiment. This allows the intermittent oscillating operation with a reduced oscillation frequency to have a wider load range. Performing the switching of the oscillation frequency in stages in accordance with an oscillation time allows the intermittent oscillating operation including a low-frequency operation to have a sufficient load range. Although the first embodiment describes that the oscillation frequency is switched two times, the number of times to switch the oscillation frequency is not limited and may be one, or three or more.

Second Embodiment

Figure 7:
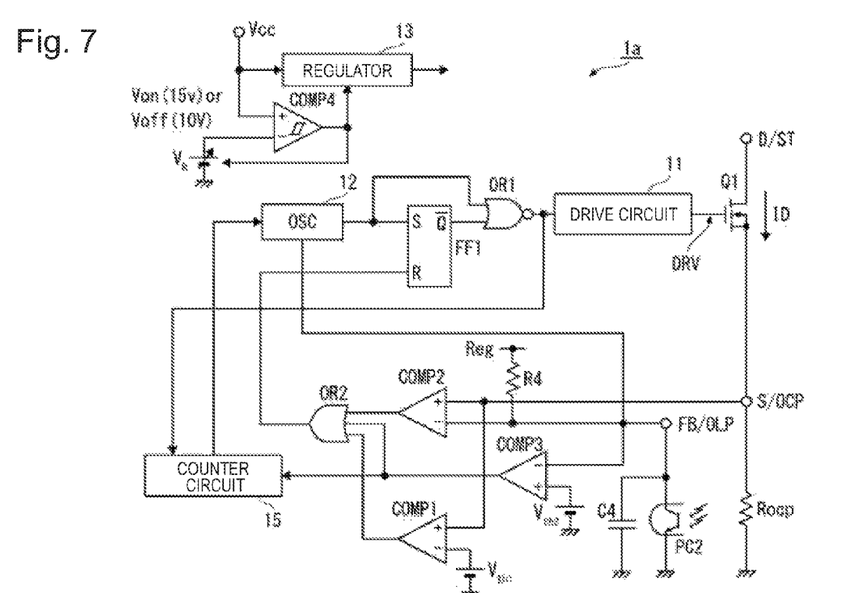
FIG. 7 illustrates a circuit configuration of the controller IC illustrated in FIG. 1 according to a second embodiment.

As illustrated in FIG. 7, controller IC 1a according to a second embodiment is provided with counter circuit 15 in place of timer circuit 14 in the first embodiment.

Counter circuit 15 receives an output signal of comparator COMP3 and an output signal of OR circuit OR1. When a load is in a range to perform the intermittent oscillating operation, the output signal of comparator COMP3 is turned off by shifting from the H level to the L level, counter circuit 15 outputs an oscillation-start detection signal to OSC 12 and starts counting of the number of oscillations based on the output signal of OR circuit OR1. Then, until the counted number of oscillations reaches at a previously set first count number, counter circuit 15 outputs, to OSC 12, a first frequency switching signal for setting the oscillation frequency to a first frequency lower than the lowest normal frequency. When the counted number of oscillations reaches at the first count number, counter circuit 15 outputs, to OSC 12, a second frequency switching signal for setting the oscillation frequency to a second frequency higher than the first frequency. When the counted number of oscillations reaches at a second count number larger than the first count number, counter circuit 15 may output, to OSC 12, the lowest normal frequency switching signal for setting the oscillation frequency to the lowest normal frequency. As described above, in the second embodiment, switching of the oscillation frequency of OSC 12 is controlled based on the counted number of oscillations. The first count number and the second count number may be individually set as appropriate.

Third Embodiment

Figure 8:
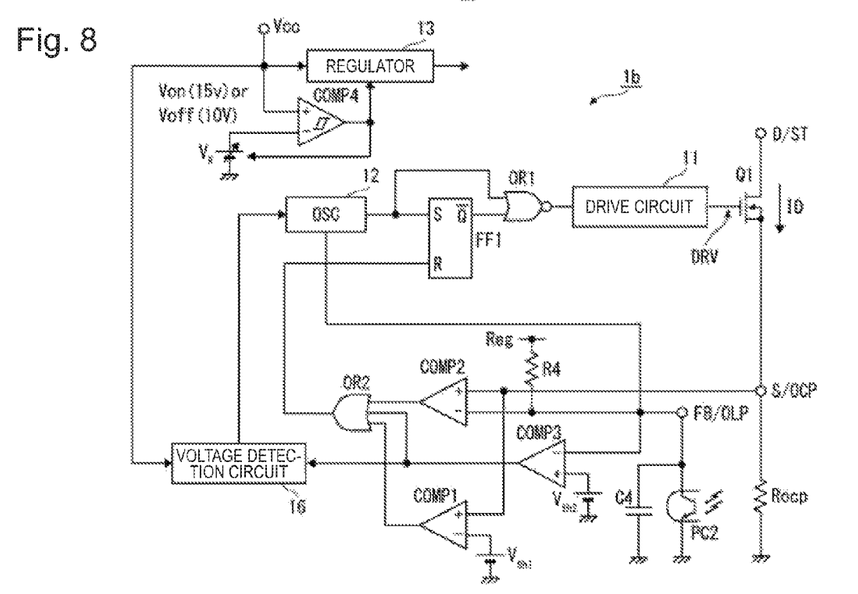
FIG. 8 illustrates a circuit configuration of the controller IC illustrated in FIG. 1 according to a third embodiment.

As illustrated in FIG. 8, controller IC 1b according to a third embodiment is provided with voltage detection circuit 16 in place of timer circuit 14 in the first embodiment. Voltage detection circuit 16 receives an output signal of comparator COMP3 and IC power-supply voltage Vcc. When a load is in a range to perform the intermittent oscillating operation, the output signal of comparator COMP3 is turned off by shifting from the H level to the L level, and voltage detection circuit 16 outputs the oscillation-start detection signal to OSC 12 and starts detection of IC power-supply voltage Vcc. Then, until IC power-supply voltage Vcc reaches at a previously set first threshold voltage, voltage detection circuit 16 outputs, to OSC 12, a first frequency switching signal for setting the oscillation frequency of OSC 12 to a first frequency lower than the lowest normal frequency. When IC power-supply voltage Vcc reaches at a previously set second threshold voltage higher than the first threshold voltage, voltage detection circuit 16 outputs, to OSC 12, a second frequency switching signal for setting the oscillation frequency to a second frequency higher than the first frequency. Increase in IC power-supply voltage Vcc depends on the intermittent oscillation duration. Thus, in the third embodiment, switching of the oscillation frequency of OSC 12 is controlled based on a detection result of IC power-supply voltage Vcc. A characteristic, such as the rate of increase, of IC power-supply voltage Vcc can be optionally adjusted to some extent with smoothing capacitor C3 and register R3. This allows the switching frequency of the intermittent oscillation duration to be kept at the first intermittent-operation frequency, and switch timing to be set as appropriate. When IC power-supply voltage Vcc is in a predetermined range, OSC 12 may change the oscillation frequency in synchronization with IC power-supply voltage Vcc.

A frequency increase pattern of increasing the oscillation frequency may be the oscillation frequency may be increased in accordance with a previously set frequency increase pattern (in stages or linear) in the intermittent oscillation duration. In a normal oscillation mode, the oscillation frequency may be repeatedly changed in accordance with a frequency change pattern including oscillation frequencies that are averaged to be the lowest normal frequency, in a duration (duration of burst threshold voltage $Vth_2$ in FIG. 3<FB voltage $V_{FB}$<frequency-reduction end voltage Vb) in which the switching operation is performed at the lowest normal frequency. This arrangement, involving change of the oscillation frequency, is expected to be effective for electromagnetic interference (EMI).

As described above, a switched-mode power supply device according to an embodiment performs the switching operation of switching element Q1 connected to primary winding P of transformer T while applying, to primary winding P of transformer T, direct-current voltage obtained by rectifying input voltage from a commercially-available alternating-current source AC, so as to cause secondary winding S of transformer T to induce a pulse voltage, which is then rectified and smoothed by the secondary-side rectifying-smoothing circuit including rectifying diode D1 and smoothing capacitor C2, to be output as an output voltage Vo to a load. The switched-mode power supply device includes error amplifier 2, OSC 12 as an internal oscillation circuit (oscillator), and comparator COMP3 serving as an intermittent oscillation control circuit. Error amplifier 2 is configured to transmit the error voltage to the primary side as a FB signal indicating the state of the load, the error voltage being obtained by comparing output voltage Vo to the reference voltage. OSC 12 is configured to control the switching frequency of the switching operation such that the switching frequency is reduced from the highest normal frequency to the lowest normal frequency based on the FB signal in a load range from a heavily-loaded state to a lightly-loaded state in the normal oscillating operation that continuously performs the switching operation. Comparator COMP3 is configured to control the intermittent oscillating operation that intermittently performs the switching operation stopping the switching operation based on the FB signal when the load is lighter than a previously set reference. OSC 12 increases the switching frequency from an intermittent-operation frequency (the first intermittent-operation frequency) lower than the lowest normal frequency in the intermittent oscillation duration that performs the switching operation in the intermittent oscillating operation.

This configuration automatically controls the intermittent oscillation duration, the switching frequency, and the number of oscillations based on the FB signal, thereby having a high versatility and achieving an improved efficiency in the intermittent oscillating operation. For example, when the load is small, the intermittent oscillating operation is performed at the intermittent-operation frequency lower than the lowest normal frequency, which leads to an improved efficiency and a reduced oscillation frequency and achieves reduction of switch loss that loss is dominant. In order to prevent a transition from the intermittent oscillating operation to a steady oscillating operation from occurring earlier than expected when the switching frequency of the intermittent oscillation duration is reduced, burst threshold voltage $Vth_2$ for a transition to the intermittent oscillating operation needs to be set high. Setting burst threshold voltage $Vth_2$ to be high causes a large drain current ID of the intermittent oscillation duration, which affects sound noise and output ripple of the transformer, for example. In the present embodiment, in the intermittent oscillation duration, the switching frequency is increased from the intermittent-operation frequency (first intermittent-operation frequency), and thus burst threshold voltage $Vth_2$ does not need to be set high, and drain current ID in the intermittent oscillation duration can be reduced. Specifically, when burst threshold voltage $Vth_2$ is fixed, a lower switching frequency results in a lower output supply electric power, and a higher switching frequency results in a higher output supply electric power. Thus, in the intermittent oscillation duration, the increase from the first intermittent-operation frequency leads to a gradual increase in the output supply electric power, thereby reducing the sound noise and output ripple of the transformer, for example.

According to another embodiment, different frequencies (the first intermittent-operation frequency and the second intermittent-operation frequency) are set as the intermittent-operation frequency, and OSC 12 increases the switching frequency by switching from the first intermittent-operation frequency, which is a lowest frequency, to the second intermittent-operation frequency higher than the first intermittent-operation frequency in the intermittent oscillation duration.

According to another embodiment, OSC 12 increases the switching frequency from the intermittent-operation frequency toward the lowest normal frequency and maintains the switching frequency when the switching frequency reaches the lowest normal frequency in the intermittent oscillation duration.

This configuration enables a transition from the intermittent oscillating operation to the normal oscillating operation to be smoothly performed because the switching frequency has been increased to and is maintained at the lowest normal frequency in the intermittent oscillation duration in the lightly-loaded state with a relatively large load.

According to another embodiment, OSC 12 may set the switching frequency back to the intermittent-operation frequency before starting the switching operation at each intermittent oscillation duration.

According to another embodiment, the switched-mode power supply device further includes timer circuit 14 configured to measure a time from start of the intermittent oscillation duration. OSC 12 increases the switching frequency from the intermittent-operation frequency based on the time measured by timer circuit 14 at each intermittent oscillation duration.

According to another embodiment, the switched-mode power supply device further includes counter circuit 15 configured to count the number of oscillations from start of the intermittent oscillation duration. OSC 12 may increase the switching frequency from the intermittent-operation frequency based on the number of oscillations counted by counter circuit 15 at each intermittent oscillation duration.

According to another embodiment, the switched-mode power supply device further includes voltage detection circuit 16 configured to detect IC power-supply voltage Vcc obtained by rectifying and smoothing a pulse voltage generated across auxiliary winding D of transformer T. OSC 12 may increase the switching frequency from the intermittent-operation frequency based on a detection result of IC power-supply voltage Vcc by voltage detection circuit 16 at each intermittent oscillation duration.

Conventional techniques such as disclosed in Patent literature 1 define the minimum number of oscillations, which reduces its versatility for supporting various power-supply specifications, and sometimes supplies an amount of energy more than needed, which results in a large output ripple and thus a reduced efficiency of an intermittent oscillating operation.

The embodiments described above solve this problem of the conventional technique, and provide a switched-mode power supply device having a high versatility and achieving an improved efficiency in an intermittent oscillating operation.

The embodiments automatically control an intermittent oscillation duration, a switching frequency, and a number of oscillations based on a FB signal, thereby having a high versatility and achieving an improved efficiency in an intermittent oscillating operation.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:
1. A switched-mode power supply device, comprising:
a transformer comprising a primary winding in a primary side to which a DC voltage is applied and a secondary winding;

a switching circuit connected to the primary winding;

a rectifying-smoothening circuit that rectifies and smoothens a pulse voltage generated at the secondary winding, by switching the switching circuit;

an output unit that outputs an output voltage obtained by the rectifying-smoothening circuit to a load;

an error amplifier that outputs an error voltage to the primary side as a feedback signal indicating a state of the load, the error voltage being obtained by comparing the output voltage to a reference voltage;

an oscillator that controls a switching frequency of the switching operation such that the switching frequency is reduced from a highest normal frequency to a lowest normal frequency based on the feedback signal in a load range from a heavily-loaded state to a lightly-loaded state in a normal oscillating operation that continuously performs the switching operation; and an intermittent oscillation control circuit that controls an intermittent oscillating operation that intermittently performs the switching operation by stopping the switching operation based on the feedback signal when the load is lighter than a previously set reference, wherein the oscillator increases the switching frequency from an intermittent-operation frequency lower than the lowest normal frequency in an intermittent oscillation duration in which the switching operation is performed in the intermittent oscillating operation.

2. The switched-mode power supply device according to claim 1, wherein different frequencies are set as the intermittent-operation frequency, and the oscillator increases the switching frequency by switching the intermittent-operation frequency from a low frequency to a high frequency in the intermittent oscillation duration.

3. The switched-mode power supply device according to claim 2, wherein the oscillator increases the switching frequency from the intermittent-operation frequency toward the lowest normal frequency and maintains the switching frequency when the switching frequency reaches the lowest normal frequency in the intermittent oscillation duration.

4. The switched-mode power supply device according to claim 2, wherein the oscillator sets the switching frequency back to the intermittent-operation frequency before starting the switching operation at each intermittent oscillation duration.

5. The switched-mode power supply device according claim 2, further comprising:

a timer circuit that measures a time from start of the intermittent oscillation duration, wherein the oscillator increases the switching frequency from the intermittent-operation frequency based on the time measured by the timer circuit at each intermittent oscillation duration.

6. The switched-mode power supply device according to claim 2, further comprising:

a counter circuit that counts the number of oscillations from start of the intermittent oscillation duration, wherein the oscillator increases the switching frequency from the intermittent-operation frequency based on the number of oscillations counted by the counter circuit at each intermittent oscillation duration.

7. The switched-mode power supply device according to claim 2, further comprising:

a voltage detection circuit that detects a power-supply voltage obtained by rectifying and smoothing a pulse voltage generated across an auxiliary winding of the transformer, wherein the oscillator increases the switching frequency from the intermittent-operation frequency based on a detection result of a power-supply voltage by the voltage detection circuit at each intermittent oscillation duration.

8. The switched-mode power supply device according to claim 1, wherein the oscillator increases the switching frequency from the intermittent-operation frequency toward the lowest normal frequency and maintains the switching frequency when the switching frequency reaches the lowest normal frequency in the intermittent oscillation duration.

9. The switched-mode power supply device according to claim 1, wherein the oscillator sets the switching frequency back to the intermittent-operation frequency before starting the switching operation at each intermittent oscillation duration.

10. The switched-mode power supply device according claim 1, further comprising:

a timer circuit that measures a time from start of the intermittent oscillation duration, wherein the oscillator increases the switching frequency from the intermittent-operation frequency based on the time measured by the timer circuit at each intermittent oscillation duration.

11. The switched-mode power supply device according to claim 1, further comprising:

a counter circuit that counts the number of oscillations from start of the intermittent oscillation duration, wherein the oscillator increases the switching frequency from the intermittent-operation frequency based on the number of oscillations counted by the counter circuit at each intermittent oscillation duration.

12. The switched-mode power supply device according to claim 1, further comprising:

a voltage detection circuit that detects a power-supply voltage obtained by rectifying and smoothing a pulse voltage generated across an auxiliary winding of the transformer, wherein the oscillator increases the switching frequency from the intermittent-operation frequency based on a detection result of a power-supply voltage by the voltage detection circuit at each intermittent oscillation duration.

* * * * *